US007922113B1

United States Patent
Alajajyan (12)

(10) Patent No.: US 7,922,113 B1
(45) Date of Patent: Apr. 12, 2011

(54) CENTRAL SHAFT CONTROLLED BRAKING OF FISHING REEL

(76) Inventor: Harout Alajajyan, Chatsworth, CA (US)

( * ) Notice: Subject to any disclaimer, the term of this patent is extended or adjusted under 35 U.S.C. 154(b) by 1 day.

(21) Appl. No.: 12/583,178

(22) Filed: Aug. 17, 2009

(51) Int. Cl.
*A01K 89/02* (2006.01)
(52) U.S. Cl. .................. 242/260; 257/303; 257/304
(58) Field of Classification Search .............. 242/290, 242/291, 302, 303, 304, 245, 249, 257, 259, 242/260
See application file for complete search history.

(56) References Cited

U.S. PATENT DOCUMENTS

| | | | | |
|---|---|---|---|---|
| 3,315,913 A | * | 4/1967 | Grieten | 242/271 |
| 5,575,432 A | * | 11/1996 | Baisch | 242/302 |
| 6,102,316 A | * | 8/2000 | Nilsen | 242/255 |
| 6,254,020 B1 | * | 7/2001 | Nilsen | 242/255 |
| 6,805,313 B2 | * | 10/2004 | Nilsen | 242/303 |
| 6,827,306 B1 | * | 12/2004 | Datcuk, Jr. | 242/303 |
| 7,234,661 B2 | * | 6/2007 | Hirayama et al. | 242/303 |
| 7,278,599 B2 | | 10/2007 | Alajajyan et al. | |
| 7,429,011 B1 | * | 9/2008 | Chang | 242/260 |
| 7,661,618 B2 | * | 2/2010 | Takechi | 242/303 |
| 7,753,304 B2 | * | 7/2010 | Ikuta et al. | 242/310 |

* cited by examiner

*Primary Examiner* — Evan H Langdon
(74) *Attorney, Agent, or Firm* — William W. Haefliger

(57) ABSTRACT

In a fishing reel, the combination operable for braking the reel, comprising a reel spool having an axis, two axially spaced brake discs on the spool, a brake pad between the discs, and the discs interconnected to rotate together and move relatively toward the pad, a braking lever movable by the user to effect the disc relative movement, and pad engagement by the discs, a shaft extending axially, and bodily movable to effect the discs relative movement, the shaft being non-rotatable, and means including an actuator for displacing the shaft axially in response to lever movement, thereby to cause braking engagement of the discs, with the pad.

10 Claims, 1 Drawing Sheet

CENTRAL SHAFT CONTROLLED BRAKING OF FISHING REEL

BACKGROUND OF THE INVENTION

Figure 1:
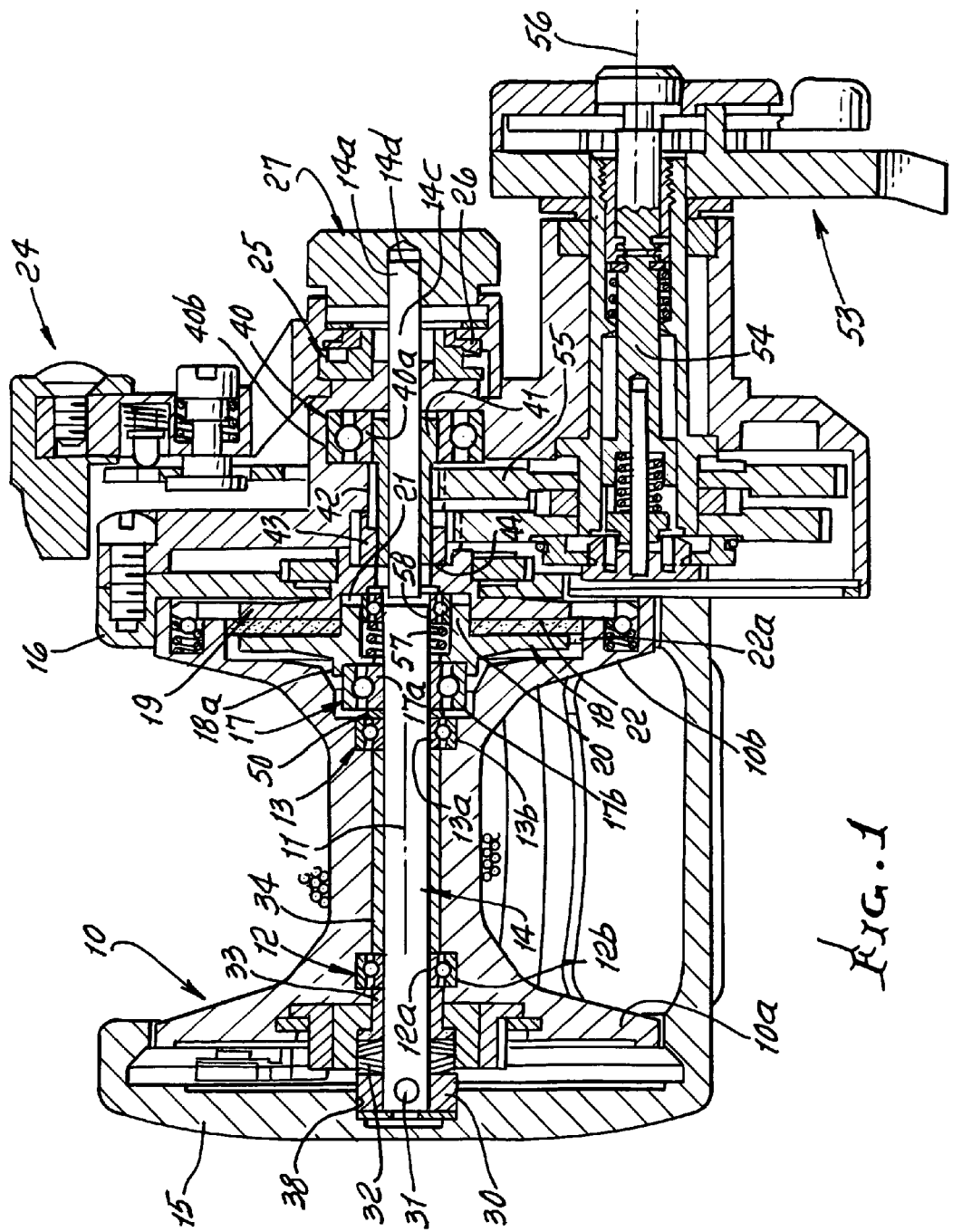

This invention relates generally to fishing reel braking systems, and more particularly to a compact, efficient, fishing reel having an axially extending, non-rotatable, elongated, brake actuating shaft that is axially movable in response to manual brake lever rotation, to transmit braking force to one of two interconnected, rotatable braking discs, causing them to exert reel braking force upon a brake pad.

There is need for simple, efficient, compact, reliable fishing reel braking systems; and there is also need for the braking system configured as disclosed herein, providing unusual advantages in structure, function and results, as will appear.

SUMMARY OF THE INVENTION

It is a major object of the invention to provide fishing reel braking means that includes:

a) a reel spool having an axis, b) two axially spaced brake discs on the spool, c) a brake pad between the discs, which are interconnected to rotate together and more relatively toward the pad, d) a braking lever movable by the user to effect such disc relative movement, and pad engagement by the discs, e) a shaft extending axially, and bodily movable to effect such discs relative movement, typically without shaft rotation, and f) means including an actuator for displacing the shaft axially in response to lever movement, thereby to cause braking engagement of the discs, with the pad.

Another object includes the provision, of a first bearing having an inner race extending about the shaft, and being axially movable with the shaft, the bearing having an outer race, one of the discs carried by that outer race, to rotate about the shaft axis. A further object includes provision of axially spaced second and third bearings having inner races carried by and extending about the shaft, and outer races rotatable with the spool, about the shaft. An added object is to provide a reel spool operatively connected to the brake pad to rotate with the spool as a crank handle is rotated to rotate the pad.

Yet another object includes provision of a sleeve to extend between the second and third bearing inner races to transmit force acting via the inner races of the second and third bearings to axially bodily displace the one disc relatively toward the other disc.

An additional object includes provision of structure including Belleville springs in the path of shaft force transmission to an inner braking disc, as the shaft is endwise displaced by manually controlled structure. The latter typically includes a manually controlled, rotatable lever, and cam elements operable by the lever to bodily and controllably displace the shaft endwise in one direction, for controlled braking, and in opposition to Belleville spring exerted force tending to displace the shaft endwise in the opposite axial direction, to release or reduce braking.

A further object, enhancing simplicity and reliability, is to provide two braking discs that have lost motion interconnection, to rotate together with a brake pad, and while allowing at least one of the discs to move axially relatively toward the other disc, for braking.

These and other objects and advantages of the invention, as well as the details of an illustrative embodiment, will be more fully understood from the following specification and drawings, in which:

DRAWING DESCRIPTION

FIG. 1 is an axial radial section showing details of a preferred braking apparatus.

DETAILED DESCRIPTION

In FIG. 1, a line winding spool 10 is rotatable about longitudinal axis 11, and is carried by axially spaced bearings 12 and 13. Inner races 12a and 13a of the bearings are carried by elongated, non-rotatable shaft 14, and bearing outer races 12b and 13b support the spool for rotation.

The spool has annular flanges 10a and 10b received within non-rotatable flange structures 15 and 16.

A larger bearing 17, adjacent bearing 13, has an inner race 17a supported on shaft 14, and an outer race 17b rotatably supporting inner brake disc 18, via annular projection 18a. Disc 18 has lost motion connection with outer brake disc 19, via an annular projection 20 on disc 18 received into recess 21 formed by disc 19, allowing the disc 18 to move axially toward and away from disc 19, but causing the two discs to rotate together about axis 11. As the braking discs are moved relatively toward one another, a rotating brake pad 22 is controllably gripped at opposite sides to slow or stop rotation of the line winding spool, to which the pad is peripherally connected, as at 22a by teeth.

Movement of the disc 18 toward the pad is controllably effected by rightward movement of the shaft 14 in response to manual rotation of drag braking lever 24 about axis 11. Such lever movement causes rotation of an annular male cam 25 relative to an annular non-rotating female cam 26. Such movement causes rightward displacement of a knob 27, to which the rightward end 14a of the shaft is connected at 14d. Elements 25-27 may be considered as actuator structure. The leftward end of the shaft is operatively connected to inner race 17a of bearing 17, to cause brake disc 18 rightward displacement toward the brake pad 22. See for example the annulus 30 to which the shaft is pin connected at 31; Belleville springs 32 engaging 30 to yieldably resist rightward movement of the shaft; annular spacer 33 in endwise engagement with those springs, inner race 12a of bearing 12 engaged by 33; elongated sleeve 34 on the shaft; inner race 13a of bearing 13 engaged by 34, and inner race 17a of bearing 17 engaged by a spacer 50 located between 13a and 17a. The connection of annulus 30 to non-rotary housing bore 38 prevents shaft 14 from rotating about axis 11.

Also provided is a bearing 40 having an inner race 40a supported by an annular spacer 41 on reduced diameter section 14c of the shaft 14, and an outer race 40b supported by non-rotating housing structure 51 connected to flange 16. Bearing 40 also serves as a gear bearing. Spacer 41 supports a relatively smaller pinion gear 42 rotatable about the shaft axis, and which in turn supports a relatively larger pinion gear 43 also rotatable about the shaft axis. Those gears transmit rotary drive to outer brake disc 19 at location 44, which in turn rotates inner disc 17 and the spool 10, coupled together. Rotary drive is transmitted to the small gear 42 from a crank handle 53 coupled to a shaft 54 and large diameter gear 55 on that shaft. The handle is rotatable about axis 56, about which gear 55 rotates, and as handle 53 is rotated, the spool 10 is rotated, via rotation of pad 22.

Coil spring 57 yieldably urges braking disc 18 relatively away from disc 19, to release pad braking when shaft 14 is not urged to the right by displacement of lever 24. A bearing 58 on shaft 14 fits between the coil spring and the outer disc 19, to transmit spring force acting to separate the discs 18 and 19. Knob 27 is rotatably adjustable to rotate the female cam 26 to a selected pre-set position, relative to the male cam, to adjust the rotating position of the lever 24, relative to shaft 24 endwise positioning, and therefore adjusting braking of the discs against the pad.

What is claimed is:

1. In a fishing reel, the combination operable for braking the reel, comprising
   a) a reel spool having an axis,
   b) two axially spaced brake discs on the spool,
   c) a brake pad between said discs, having disc engaging surfaces and the discs interconnected to rotate together and move relatively toward the pad,
   d) a braking lever movable by the user to effect said discs relative movement, and pad engagement by the discs,
   e) a shaft extending axially, and bodily movable to effect said discs relative movement, the shaft being non-rotatable,
   f) means including an actuator for displacing the shaft axially in response to lever movement, thereby to cause braking engagement of the discs, with the pad,
   g) and a coil spring urging disc separation and positioned radially inwardly of an annular ledge integral with one of the discs, the ledge penetrating axially within and proximate the internal diameter of the other disc, whereby the disc engaging braking surfaces of the brake pad project radially into proximity to the ledge.

2. The combination of claim 1 including a first bearing having an inner race extending about the shaft, and being axially movable with the shaft, the bearing having an outer race, one of the discs carried by said outer race, to rotate about the shaft axis.

3. The combination of claim 2 including said reel spool operatively connected to the pad to rotate with said pad as a crank is manually rotated.

4. The combination of claim 2 including axially spaced second and third bearings having inner races carried by and extending about the shaft, and outer races rotatable with the spool, about the shaft.

5. The combination of claim 4 including a sleeve extending axially between the second and third bearing inner races to transmit shaft exerted force acting through the inner races of the second and third bearings to axially bodily displace the one disc relative toward the other disc.

6. The combination of claim 5 in which the reel spool is operatively connected to the brake pad to rotate with said pad as a crank is rotated.

7. The combination of claim 1 wherein said brake actuating lever is rotatable about the shaft axis, and including cam structures responsive to lever rotation in one rotary direction to displace the shaft endwise in one direction.

8. The combination of claim 5 including Belleville spring means for transmitting shaft exerted force to displace the sleeve endwise, thereby to displace the one disc.

9. The combination of claim 1 wherein the two braking discs have lost motion interconnection to rotate together, while allowing at least one of the discs to move axially relatively toward the other disc.

10. The combination of claim 1 wherein the actuator includes an adjusting knob connected to the shaft, and cam means to adjust the endwise position of the shaft in response to knob rotation, thereby to adjust braking of the discs against the pad as a function of lever rotation.

* * * * *